(12) United States Patent
Eckel et al.

(10) Patent No.: US 11,634,578 B2
(45) Date of Patent: Apr. 25, 2023

(54) SICOPC BLEND CONTAINING PHOSPHAZENE AND SILICONE/ACRYLATE IMPACT MODIFIER

(71) Applicant: Covestro Intellectual Property GmbH & Co. KG, Leverkusen (DE)

(72) Inventors: Thomas Eckel, Dormagen (DE); Alexander Meyer, Düsseldorf (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/294,498

(22) PCT Filed: Nov. 4, 2019

(86) PCT No.: PCT/EP2019/080067
§ 371 (c)(1),
(2) Date: May 17, 2021

(87) PCT Pub. No.: WO2020/108922
PCT Pub. Date: Jun. 4, 2020

(65) Prior Publication Data
US 2021/0403707 A1    Dec. 30, 2021

(30) Foreign Application Priority Data

Nov. 29, 2018  (EP) ..................... 18209203

(51) Int. Cl.
| | | |
|---|---|---|
| C08L 69/00 | (2006.01) | |
| C08L 51/08 | (2006.01) | |
| C08K 5/5399 | (2006.01) | |
| C08K 3/34 | (2006.01) | |

(52) U.S. Cl.
CPC ............. *C08L 69/00* (2013.01); *C08K 3/34* (2013.01); *C08K 5/5399* (2013.01); *C08L 51/085* (2013.01); C08L 2203/30 (2013.01); C08L 2205/03 (2013.01)

(58) Field of Classification Search
None
See application file for complete search history.

(56) References Cited

U.S. PATENT DOCUMENTS

| | | |
|---|---|---|
| 2,891,920 A | 6/1959 | Hyde et al. |
| 2,991,273 A | 7/1961 | Hechelhammer et al. |
| 2,999,835 A | 9/1961 | Goldberg |
| 2,999,846 A | 9/1961 | Schnell et al. |
| 3,148,172 A | 9/1964 | Fox |
| 3,189,662 A | 6/1965 | Vaughn, Jr. |
| 3,271,367 A | 9/1966 | Schnell et al. |
| 3,294,725 A | 12/1966 | Findlay et al. |
| 3,419,634 A | 12/1968 | Vaughn, Jr. |
| 4,584,360 A | 4/1986 | Paul et al. |
| 4,806,593 A | 2/1989 | Kress et al. |
| 4,877,831 A | 10/1989 | Hongo et al. |
| 4,888,388 A | 12/1989 | Hongo et al. |
| 4,982,014 A | 1/1991 | Freitag et al. |
| 5,097,002 A | 3/1992 | Sakashita et al. |
| 5,227,449 A | 7/1993 | Odell et al. |
| 5,340,905 A | 8/1994 | Kuhling et al. |
| 5,414,054 A | 5/1995 | Simon et al. |
| 5,717,057 A | 2/1998 | Sakashita et al. |
| 5,807,914 A | 9/1998 | Obayashi et al. |
| 5,821,321 A | 10/1998 | Archey et al. |
| 6,093,759 A | 7/2000 | Gareiss et al. |
| 6,596,840 B1 | 7/2003 | Kretschmer et al. |
| 6,740,730 B1 | 5/2004 | Kratschmer et al. |
| 7,071,284 B2 | 7/2006 | Kauth et al. |
| 7,232,854 B2 | 6/2007 | Ma et al. |
| 11,161,938 B2 | 11/2021 | Meyer et al. |
| 2007/0149722 A1 | 6/2007 | Fujiguchi et al. |
| 2013/0267665 A1 | 10/2013 | Huggins et al. |
| 2013/0317143 A1 | 11/2013 | Daga et al. |
| 2014/0371360 A1 | 12/2014 | Zheng et al. |
| 2015/0247038 A1* | 9/2015 | Kim ................ C08L 69/00 524/127 |

(Continued)

FOREIGN PATENT DOCUMENTS

| | | |
|---|---|---|
| DE | 3832396 A | 2/1990 |
| DE | 19710081 A1 | 9/1998 |

(Continued)

OTHER PUBLICATIONS

Schnell, H., Chemistry and Physics of Polycarbonates, Interscience Publishers, New York 1964, p. 28ff and p. 102ff.

(Continued)

*Primary Examiner* — David J Buttner
(74) *Attorney, Agent, or Firm* — John E. Mrozinski, Jr.; Richard P. Bender

(57) ABSTRACT

The invention relates to a composition for production of a thermoplastic moulding compound, wherein the composition comprises or consists of the following constituents:

A) 42% to 80% by weight of at least one polymer selected from the group consisting of aromatic polycarbonate and aromatic polyestercarbonate, B) 2% to 38% by weight of at least one polysiloxane-polycarbonate block co-condensate, C) 1% to 15% by weight of at least one rubber-modified graft polymer comprising
  C.1) 5% to 95% by weight based on the graft polymer C of a shell composed of at least one vinyl monomer and
  C.2) 95% to 5% by weight based on the graft polymer C of a graft substrate composed of silicone-acrylate composite rubber, D) 2% to 10% by weight of at least one phosphazene, E) 0% to 10% by weight of at least one additive, to the moulding compound itself, to the use of the composition or moulding compound for production of moulded articles and to the moulded articles themselves.

8 Claims, No Drawings

(56) References Cited

U.S. PATENT DOCUMENTS

| | | | |
|---|---|---|---|
| 2015/0307707 A1* | 10/2015 | Jung | C07F 9/659 |
| | | | 558/80 |
| 2016/0244560 A1 | 8/2016 | Meyer et al. | |
| 2017/0247539 A1 | 8/2017 | Chen et al. | |
| 2020/0369875 A1* | 11/2020 | Shan | C08L 69/00 |

FOREIGN PATENT DOCUMENTS

| | | | |
|---|---|---|---|
| EP | 0430134 A2 | | 6/1991 |
| EP | 0728811 A2 | | 8/1996 |
| GB | 1122003 A | | 7/1968 |
| GB | 1229482 | | 4/1971 |
| GB | 1341318 A | | 12/1973 |
| GB | 1367788 A | | 9/1974 |
| GB | 1367790 A | | 9/1974 |
| WO | 2014086800 A1 | | 6/2014 |
| WO | 2015022676 A1 | | 2/2015 |
| WO | 2015065611 A1 | | 5/2015 |
| WO | WO2020/118478 | * | 6/2020 |

OTHER PUBLICATIONS

Legrand, D.G. et al., Handbook of Polycarbonate Science and Technology, Marcel Dekker New York 2000, p. 72ff.

Scholtan, W. et al., Kolloid, Z. and Z. Polymere [polymers] 250 (1972), 782-796.

International Search Report, PCT/EP2019/080067, dated Jan. 24, 2020, Authorized officer: Sven Scheunemann.

* cited by examiner

SICOPC BLEND CONTAINING PHOSPHAZENE AND SILICONE/ACRYLATE IMPACT MODIFIER

CROSS-REFERENCE TO RELATED APPLICATION

This application is a national stage under 35 U.S.C. § 371 of PCT/EP2019/080067, filed Nov. 4, 2019, which claims the benefit of European Application No. 18209203.1, filed Nov. 29, 2018, each of which is incorporated herein by reference.

DETAILED DESCRIPTION OF THE INVENTION

The present invention relates to a composition based on polycarbonate and a polysiloxane-polycarbonate block co-condensate (also referred to hereinbelow as SiCoPC or siloxane-containing block co-condensate) for producing a thermoplastic moulding compound, to the moulding compound itself, to the use of the composition or moulding compound for producing moulded articles and to the moulded articles themselves.

Polycarbonate compositions including blends with further thermoplastics have long been known. Varying the constituents and their proportions in the compositions makes it possible to adapt the thermal, rheological and mechanical properties of the moulding compounds obtained by compounding of the composition and also the moulded articles produced therefrom to the particular requirements over wide ranges.

Numerous patent applications additionally state that they can be improved in terms of their toughness properties by the use of rubber-modified graft polymers. It is also known that the use of phosphorus-containing flame retardants can achieve very good flame retardancy.

However, some flame retardants such as for example phosphates reduce toughness and have a plasticizing effect, their use thus therefore also impairing heat resistance. Phosphazenes may therefore be alternatively employed as flame retardants. While these are less cost-effective than phosphates and reduce melt flowability they do make it possible to achieve good heat resistance coupled with generally likewise acceptable toughness properties.

Polysiloxane-polycarbonate block co-condensates are in some cases known to exhibit advantages over conventional polycarbonates (for example bisphenol A-based homopolycarbonate) in terms of important properties such as for example low-temperature impact strength/low-temperature notched impact strength, chemicals resistance and exterior weathering resistance as well as aging characteristics and flame resistance.

These polysiloxane-polycarbonate block co-condensates may also be employed in combination with impact modifiers and flame retardants alone or together with homopolycarbonate.

US 2007/0149722 A discloses flame-retarded thermoplastic compositions containing polycarbonate, polycarbonate-siloxane copolymer, an impact modifier and a flame retardant. The impact modifier preferably is based on a butyl acrylate-based rubber and bisphenol A diphosphate (BDP) is recited as the flame retardant. The compositions feature good physical properties such as impact strength and flowability coupled with the good flame retardancy.

EP 1713863 B1 discloses polycarbonate compositions containing a polycarbonate-siloxane copolymer, a mineral filler and a phosphate-based flame retardant. The compositions feature good flame retardancy coupled with thin wall thicknesses and good mechanical properties.

US 2013/0317143 A1 discloses flame-retarded compositions containing polycarbonate, polycarbonate-siloxane copolymer, impact modifier and phosphazene. Impact modifiers described include for example MBS, ABS, silicone/acrylate-based modifiers, ASA and AES. The use of phosphazene as a flame retardant achieves good heat resistance coupled with good toughness and flame retardancy.

WO 2015/065611 A1 discloses flame-retardant polymer compositions containing polycarbonate, polycarbonate-siloxane copolymer, reinforcer, a phosphorous-based flame retardant and optionally an impact modifier. Suitable flame retardants are phosphate and phosphazenes. The compositions feature a good stiffness and toughness coupled with good processability, appearance and flame retardancy at thin wall thicknesses.

WO 2015/022676 A1 discloses thermoplastic compositions containing at least one polycarbonate, at least one impact modifier, at least one mineral filler and at least one flame retardant. The compositions may be used for articles where great demands in terms of stiffness, toughness, flowability, flame retardancy and heat resistance are made of the material.

JP 2015-034191 A discloses a transparent thermoplastic moulding compound containing polycarbonate, polycarbonate-polyorganosiloxane copolymer and phosphazene. The moulding compound contains no anti-drip agent and features good toughness, flowability and flame retardancy.

WO 2014/086800 A1 discloses compositions containing polycarbonate, rubber-modified graft polymer having a graft substrate selected from silicone rubber, silicone-acrylate rubber and acrylate rubber and phosphazene. The compositions achieve good heat resistance, flame retardancy, notched impact strength and chemicals resistance.

However, for some applications the disclosed moulding compounds and the moulded articles produced therefrom are not yet adequate in terms of the balance of mechanical properties, hydrolysis stability and chemicals resistance.

Furthermore, polysiloxane-polycarbonate block co-condensates and also graft polymers can also have a negative effect on the surface quality of the moulded articles. In addition, polysiloxane-polycarbonate block co-condensates are more expensive to produce than for example bisphenol A-based homopolycarbonate.

It was thus desirable to produce a flame-retarded composition for producing a thermoplastic moulding compound which offers an improved overall profile in respect of the abovementioned properties. The moulding compounds should preferably be processable into moulded articles having good surface properties.

It was in particular desirable for the moulded articles to exhibit a good notched impact strength at low temperatures, good multiaxial toughness, i.e. in the puncture test, high stiffness (tensile elastic modulus), stability toward hydrolytically induced molecular weight degradation and the influence of chemicals and preferably a high gloss without significant surface defects.

It has now been found that, surprisingly, the advantageous properties are exhibited by a composition for producing a thermoplastic moulding compound, wherein the composition contains or consists of the following constituents:

A) 42% to 80% by weight, preferably 45% to 75% by weight, particularly preferably 50% to 70% by weight, of at least one polymer selected from the group consisting of aromatic polycarbonate and aromatic polyestercarbonate, B) 2% to 38% by weight, preferably 5% to 35% by weight, particularly preferably 15% to 35% by weight, of at least one polysiloxane-polycarbonate block cocondensate, C) 1% to 15% by weight, preferably 4% to 12% by weight, particularly preferably 5% to 11% by weight, of at least one rubber-modified graft polymer comprising
  C.1) 5% to 95% by weight, preferably 7% to 50% by weight, particularly preferably 10% to 30% by weight, based on the graft polymer C, of a shell of at least one vinyl monomer and
  C.2) 95% to 5% by weight, preferably 93% to 50% by weight, particularly preferably 90% to 70% by weight, based on the graft polymer C, of a graft substrate of silicone-acrylate composite rubber, D) 2% to 10% by weight, preferably 3% to 8% by weight, particularly preferably 4% to 8% by weight, of at least one phosphazene, E) 0% to 10% by weight, preferably 0.1% to 7% by weight, particularly preferably 0.2% to 5% by weight, of at least one additive.

In a preferred embodiment the composition consists of components A, B, C, D and E to an extent of at least 90% by weight, more preferably to an extent of at least 95% by weight and particularly preferably to an extent of 100% by weight.

Component A

Polycarbonates in the context of the present invention include not only homopolycarbonates but also copolycarbonates and/or polyestercarbonates; the polycarbonates may be linear or branched in a known manner. According to the invention, it is also possible to use mixtures of polycarbonates.

The weight-average molecular weight $M_w$ of the aromatic polycarbonates and polyestercarbonates is in the range from 15 000 to 40 000 g/mol, preferably in the range from 20 000 to 35 000 g/mol, more preferably 23 000 to 33 000 g/mol, determined by GPC (gel permeation chromatography in methylene chloride using a bisphenol A-based polycarbonate as a standard).

A portion of up to 80 mol %, preferably of 20 mol % to 50 mol %, of the carbonate groups in the polycarbonates used in accordance with the invention may be replaced by aromatic dicarboxylic ester groups. Polycarbonates of this kind that incorporate both acid radicals from the carbonic acid and acid radicals from aromatic dicarboxylic acids into the molecular chain are referred to as aromatic polyester carbonates. In the context of the present invention, they are covered by the umbrella term of thermoplastic aromatic polycarbonates.

The polycarbonates are produced in a known manner from diphenols, carbonic acid derivatives, optionally chain terminators and optionally branching agents, and the polyester carbonates are produced by replacing a portion of the carbonic acid derivatives with aromatic dicarboxylic acids or derivatives of the dicarboxylic acids, to a degree according to the extent to which carbonate structural units in the aromatic polycarbonates are to be replaced by aromatic dicarboxylic ester structural units.

Dihydroxyaryl compounds suitable for producing polycarbonates are those of formula (1)

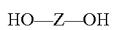
(1), in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

It is preferable when Z in formula (1) is a radical of the formula (2)

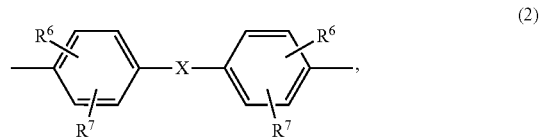

in which $R^6$ and $R^7$ independently of one another represent H, $C_1$- to $C_{18}$-alkyl, $C_1$- to $C_{18}$-alkoxy, halogen such as Cl or Br or in each case optionally substituted aryl- or aralkyl, preferably H or $C_1$- to $C_{12}$-alkyl, particularly preferably H or $C_1$- to $C_8$-alkyl and very particularly preferably H or methyl, and X represents a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else represents $C_6$- to $C_{12}$-arylene which may optionally be fused to further aromatic rings containing heteroatoms.

It is preferable when X represents a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of the formula (2a)

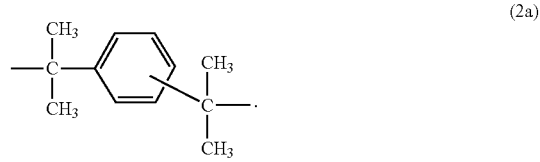

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl)ethers, bis(hydroxyphenyl)ketones, bis(hydroxyphenyl)sulfides, bis(hydroxyphenyl)sulfones, bis(hydroxyphenyl)sulfoxides, 1,1'-bis(hydroxyphenyl)diisopropylbenzenes and the ring-alkylated and ring-halogenated compounds thereof.

Diphenols suitable for producing the polycarbonates for use according to the invention are for example hydroquinone, resorcinol, dihydroxydiphenyl, bis(hydroxyphenyl)alkanes, bis(hydroxyphenyl)cycloalkanes, bis(hydroxyphenyl)sulfides, bis(hydroxyphenyl)ethers, bis(hydroxyphenyl) ketones, bis(hydroxyphenyl)sulfones, bis(hydroxyphenyl) sulfoxides, α,α'-bis(hydroxyphenyl)diisopropylbenzenes and alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4- hydroxyphenyl)sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

Greatest preference is given to 2,2-bis(4-hydroxyphenyl) propane (bisphenol A).

These and other suitable diphenols are described by way of example in U.S. Pat Nos. 2,999,835 A, 3,148,172 A, 2,991,273 A, 3,271,367 A, 4,982,014 A and 2,999,846 A, in German laid-open specifications 1 570 703 A, 2 063 050 A, 2 036 052 A, 2 211 956 A and 3 832 396 A, in the French patent specification 1 561 518 A1, in the monograph "H. Schnell, Chemistry and Physics of Polycarbonates, Interscience Publishers, New York 1964, p. 28ff and p. 102ff", and in "D. G. Legrand, J. T. Bendler, "Handbook of Polycarbonate Science and Technology, Marcel Dekker New York 2000, p. 72ff".

In the case of the homopolycarbonates only one diphenol is used and in the case of copolycarbonates two or more diphenols are used. The diphenols employed, similarly to all other chemicals and assistants added to the synthesis, may be contaminated with the contaminants from their own synthesis, handling and storage. However, it is desirable to use raw materials of the highest possible purity.

The monofunctional chain terminators required for molecular-weight regulation, for example phenols or alkylphenols, in particular phenol, p-tert-butylphenol, isooctylphenol, cumylphenol, chlorocarbonic esters thereof or acyl chlorides of monocarboxylic acids or mixtures of these chain terminators, are either supplied to the reaction with the bisphenoxide(s) or else are added at any desired juncture in the synthesis provided that phosgene or chlorocarbonic acid end groups are still present in the reaction mixture or, in the case of acyl chlorides and chlorocarbonic esters as chain terminators, as long as sufficient phenolic end groups of the resulting polymer are available. However, it is preferable when the chain terminator(s) is/are added after the phosgenation at a location or at a juncture at which phosgene is no longer present but the catalyst has not yet been added or when they are added before the catalyst or together or in parallel with the catalyst.

Any branching agents or branching agent mixtures to be used are added to the synthesis in the same manner, but typically before the chain terminators. Compounds typically used are trisphenols, quaterphenols or acyl chlorides of tri- or tetracarboxylic acids, or else mixtures of the polyphenols or of the acyl chlorides.

Some of the compounds having three or more than three phenolic hydroxyl groups that are usable as branching agents are, for example, phloroglucinol, 4,6-dimethyl-2,4,6-tri-(4-hydroxyphenyl)hept-2-ene, 4,6-dimethyl-2,4,6-tri(4-hydroxyphenyl)heptane, 1,3,5 -tris(4-hydroxyphenyl)benzene, 1,1,1-tri(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of any branching agents to be used is 0.05 mol % to 2 mol %, in turn based on moles of diphenols used in each case.

The branching agents may either be initially charged with the diphenols and the chain terminators in the aqueous alkaline phase or added dissolved in an organic solvent before the phosgenation.

All of these measures for producing the polycarbonates are familiar to those skilled in the art.

Aromatic dicarboxylic acids suitable for producing the polyestercarbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of the dicarboxylic acids include the dicarbonyl halides and the dialkyl dicarboxylates, especially the dicarbonyl chlorides and the dimethyl dicarboxylates.

The carbonate groups are replaced essentially stoichiometrically and also quantitatively by the aromatic dicarboxylic ester groups, and so the molar ratio of the coreactants is also reflected in the finished polyester carbonate. The aromatic dicarboxylic ester groups can be incorporated either randomly or blockwise.

Preferred modes of production of the polycarbonates to be used according to the invention, including the polyester carbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

In the former case the acid derivatives used are preferably phosgene and optionally dicarbonyl dichlorides, and in the latter case preferably diphenyl carbonate and optionally dicarboxylic diesters. Catalysts, solvents, workup, reaction conditions etc. for polycarbonate production or polyester carbonate production are sufficiently well described and known in both cases.

Most preferably employed as component A is bisphenol A-based aromatic polycarbonate.

Component B

The polysiloxane-polycarbonate block co-condensates are block co-condensates comprising the following structural units

(3)

wherein R1 is a divalent substituted or unsubstituted aromatic radical, a divalent linear or cyclic aliphatic radical or the structural unit (3) is a mixture of units, wherein R1 is a divalent substituted or unsubstituted aromatic radical or R1 is a divalent linear or cyclic aliphatic radical and the proportion of aromatic R1 radicals is 60-100% by weight and the proportion of aliphatic radicals is 0-40% by weight based on the sum of the employed diphenols of the below-mentioned formula (5) in % by weight, and structural unit (4)

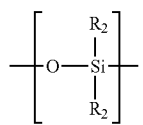

wherein R2 is independently at each occurrence a linear or branched aliphatic radical, preferably C1-C12 alkyl, particularly preferably C1 to C4 alkyl, especially methyl, or a substituted or unsubstituted aromatic radical, preferably phenyl.

Very particularly preferred structural units (4) are dimethylsiloxane units, or diphenylsiloxane units, methyl/phenylsiloxane units or mixtures of dimethylsiloxane and diphenylsiloxane units.

The component B preferably contains 2% to 20% by weight, preferably 3% to 10% by weight, of structural units of formula (4), hereinbelow also referred to as siloxane blocks.

In the structural unit (3) R1 is preferably derived from dihydroxyaryl compounds conforming to formula (5):

in which

Z is an aromatic radical having 6 to 30 carbon atoms which may comprise one or more aromatic rings, may be substituted and may comprise aliphatic radicals or alkylaryls or heteroatoms as bridging elements.

It is preferable when Z in formula (5) is a radical of formula (5a)

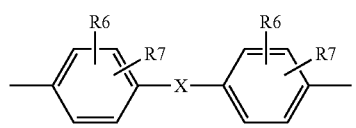

in which

R6 and R7 independently of one another represent H, C1-C18-alkyl, C1-C18-alkoxy, halogen such as Cl or Br or in each case optionally substituted aryl or aralkyl, preferably independently of one another represent H or C1-C12-alkyl, particularly preferably H or C1-C8-alkyl and very particularly preferably independently of one another represent H or methyl, and X represents —CO—, —O—, —S—, C1- to C6-alkylene, C2- to C5-alkylidene, C6 to C10-cycloalkylidene or C6- to C12-arylene which may optionally be fused to further aromatic rings containing heteroatoms.

It is preferable when X represents C1 to C5-alkylene, C2 to C5-alkylidene, C6 to C9-cyclohexylidene —O—, —SO—, —CO—, —S—, —SO2—, particularly preferably isopropylidene, 3,3,5-trimethylcyclohexylidene or oxygen, especially isopropylidene.

Examples of diphenols of formula (5) that are suitable for the production of the SiCoPCs according to the invention include hydroquinone, resorcinol, bis(hydroxyphenyl)alkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, [alpha],[alpha]'-bis(hydroxyphenyl)diisopropylbenzenes and also the alkylated, ring-alkylated and ring-halogenated compounds thereof.

More preferred diphenols of formula (5) are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexane and 1,1-bis(4-hydroxyphenyl)-3,3,5-trimethylcyclohexane.

Particularly preferred diphenols of formula (5) are 2,2-bis(4-hydroxyphenyl)propane (BPA), hydroquinone, 1,1-bis(4-hydroxyphenyl)-3,3,5-trimethylcyclohexane and 2,2-bis(3-methyl-4-hydroxyphenyl)propane.

These and further suitable diphenols are commercially available and described for example in "H. Schnell, Chemistry and Physics of Polycarbonates, Interscience Publishers, New York 1964, p. 28 ff; p. 102 ff", and in "D. G. Legrand, J. T. Bendler, Handbook of Polycarbonate Science and Technology, Marcel Dekker New York 2000, p. 72 ff."

In one embodiment, the siloxane block may have the following structure (6)

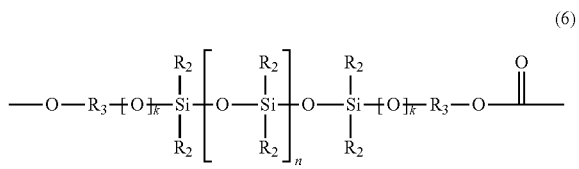

wherein R2 is as defined above, n represents an average number from 10 to 400, preferably 10 to 100, particularly preferably 15 to 50, in each case determined by 1H-NMR spectroscopy, k represents 0 or 1.

R3 independently at each occurrence comprises the following structural elements (7) or (8):

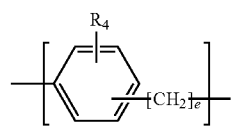

wherein R4 is independently at each occurrence hydrogen, halogen and/or a C1 to C10, preferably C1 to C4, linear or branched, unsubstituted or mono- to tetrasubstituted alkyl radical or alkoxy radical, wherein the alkyl and alkoxy radicals are preferably unsubstituted, and R4 is especially preferably hydrogen, e is 0 or a natural number from 2 to 12, preferably 2 to 6, wherein, in the case where e is 0, k is 1, or a structural element of formula (8)

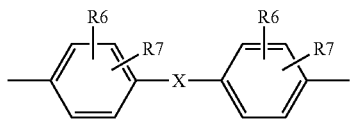

(8)

wherein R6, R7 and X are as defined above for formula (5a).

By way of example and preferably the siloxane block may comprise the structures:

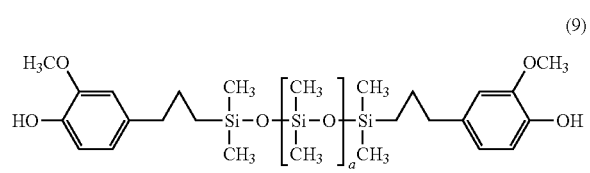

(9)

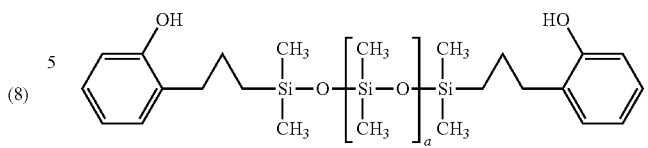

(10)

wherein a in formulae (9) and (10) represents an average number from 10 to 400, preferably 10 to 100 and particularly preferably 15 to 50 in each case determined by 1H-NMR spectroscopy.

The 1H-NMR spectroscopy of all siloxane blocks shown here and the component B overall may be carried out in deuterated chlorinated solvents, preferably in deuterated chloroform or deuterated dichloromethane. Suitable signals are integrated and compared in each case.

In the structures 9 and 10 for example a is determined by using the integral of the $SiCH_3$ protons between 0 and 0.5 ppm chemical shift and the integral of the adjacent $CH_2$ at about 2.6 ppm chemical shift.

In a further embodiment, the abovementioned siloxane blocks may be joined one or more times via terephthalic acid or isophthalic acid to afford the following exemplary structural elements:

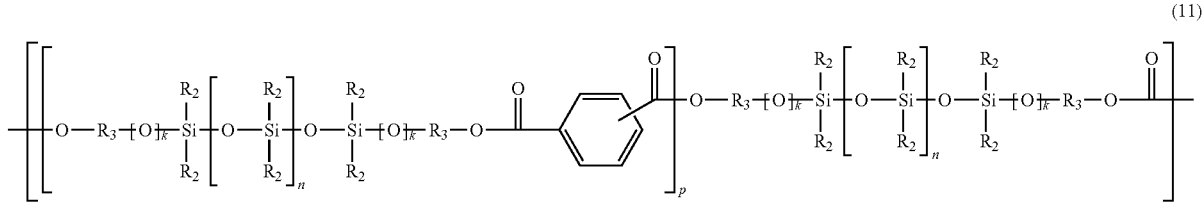

(11)

wherein p represents 0 or 1,
R2, R3, n and k are as defined above for structural element (6).

Corresponding siloxane blocks for reaction with polycarbonate or for reaction with diphenols derived from formula (5) or (5a) with phosgene or diaryl carbonates each have terminal phenolic OH groups. i.e.

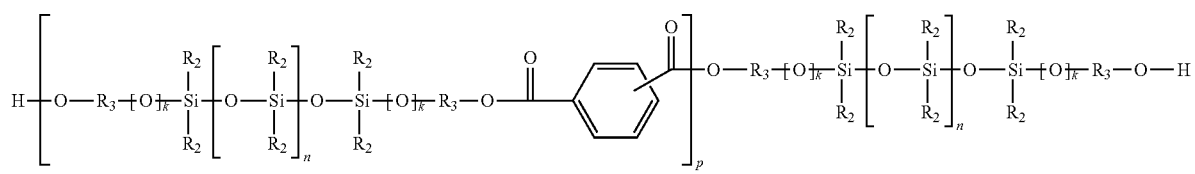

(11a)

wherein R2, R3, n, k and p are as defined for structural element (11).

It is especially preferable when the siloxane blocks are hydroxyaryl-terminated (poly)siloxanes of formula (12)

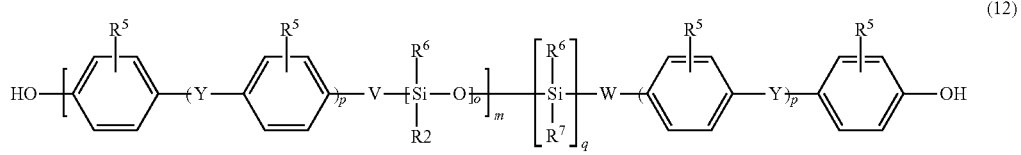

(12)

In general formula (12) $R^5$ represents hydrogen or C1- to C4-alkyl, C1- to C4-alkoxy, preferably hydrogen or methyl, methyloxy, particularly preferably hydrogen.

$R^6$ and $R^7$ independently of one another represent aryl, preferably phenyl, C1 to C4 alkyl, preferably methyl, especially methyl.

Y represents a single bond, —CO—, —O—, $C_1$- to $C_5$-alkylene, $C_2$- to $C_5$-alkylidene or a $C_5$- to $C_6$-cycloalkylene radical which may be mono- or polysubstituted by $C_1$- to $C_4$-alkyl, preferably a single bond, —O—, isopropylidene or a $C_5$- to $C_6$-cycloalkylidene radical which may be mono- or polysubstituted by $C_1$- to $C_4$-alkyl, especially isopropylidene.

V represents oxygen, C1-C6 alkylene or C2- to C5-alkylidene, preferably a single bond, oxygen, C3 alkylene, especially oxygen or isopropylidene.

W represents a single bond, S, C1 to C6-alkylene or C2- to C5-alkylidene, preferably a single bond, C3 alkylene or isopropylidene, wherein W is not a single bond when q represents 1.

p and q each independently of one another represent 0 or 1.

o represents an average number of repeating units from 10 to 400, preferably 10 to 100, particularly preferably 15 to 50, in each case determined by 1H-NMR spectroscopy.

o is determined for example using the integral of the central Si—CH3 protons (at about 0.1 ppm chemical shift) in relation to the integral of the two terminal siloxane units of the block, i.e. O—Si(CH3)2 (at about 0.2 ppm chemical shift)

m represents an average number of repeating units from 1 to 10, preferably 1 to 6, particularly preferably 1.5 to 5, in each case determined by 1H-NMR spectroscopy.

Very particular preference is given to siloxanes of formulae (13) and (14)

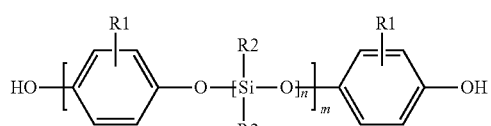

(13)

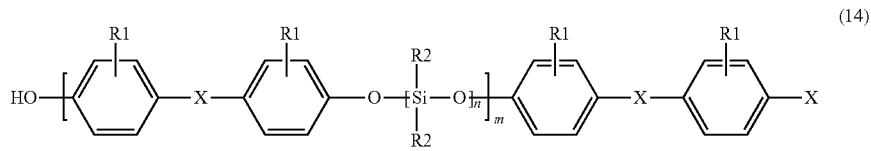

(14)

wherein R1 represents hydrogen, Cl, Br, C1-C4-alkyl, preferably hydrogen or methyl and especially preferably hydrogen, R2 independently of one another represent aryl or alkyl, preferably methyl, X represents a single bond, —SO2—, —CO—, —O—, —S—, C1- to C6-alkylene, C2- to C5-alkylidene or C6- to C12-arylene which may optionally be fused to aromatic rings containing further heteroatoms, X preferably represents a single bond, C1 to C5-alkylene, C2 to C5-alkylidene, C5 to C12-cycloalkylidene, —O—, —SO—, —CO—, —S—, —SO2—, particularly preferably a single bond, isopropylidene, C5 to C12 cycloalkylidene or oxygen and very particularly preferably isopropylidene, n represents an average number from 10 to 400, preferably 10 to 100, especially preferably 10 to 50, in each case determined by 1H-NMR spectroscopy and m represents an average number from 1 to 10, preferably from 1 to 6 and especially preferably from 1.5 to 5, in each case determined by 1H-NMR spectroscopy.

Determination of n in the structures 11, 13 and 14 is carried out as per the method described above for o.

Determination of m employs the integrals of the protons at the terminal phenyl groups, for example at the terminal bisphenol-A-derived units, and the integrals of central phenyl groups, for example at the central bisphenol-A-derived units.

Greatest preference is given to siloxanes of formula 14 since they exhibit a particularly good thermal stability and colour stability.

The weight-average molecular weight $M_w$ of the siloxane component, i.e. of the siloxane block, is preferably 3000 to 20 000 g/mol, determined by gel permeation chromatography and using a BPA (bisphenol A) polycarbonate standard, and especially preferably 3500-15 000 g/mol.

Production of the siloxanes of formulae (12) to (14) is described in DE 33 34 782 A1 and DE 19710081 for example.

The siloxane component of formula (12), (13) or (14) are employed in amounts of 0.5% to 50% by weight, preferably of 1% to 40% by weight, especially preferably of 2% to 20% by weight and very particularly preferably of 2.5% to 10% by weight in each case based on the components A) and B).

The production of the siloxane blocks is known in principle and they can be produced by processes as described, for example, in US20130267665.

The polysiloxane-polycarbonate block co-condensates are normally industrially produced from the monomers by the interfacial process with phosgene. The production of these polysiloxane-polycarbonate block co-condensates by the melt transesterification process using diphenol carbonate is also known.

The production of polysiloxane-polycarbonate block co-condensates by the interfacial process is known from the literature and is described for example in U.S. Pat. Nos. 3,189,662, 3,419,634, DE-A 3 34 782 and EP 0 122 535.

The production of polysiloxane-polycarbonate block co-condensates by the melt transesterification process from bisphenol, diaryl carbonate, silanol-end-terminated polysiloxanes and catalyst is described in U.S. Pat. No. 5,227,449.

Reactive extrusion processes for producing polysiloxane-polycarbonate block co-condensates have also been described. This has been publicized for example in U.S. Pat. Nos. 5,414,054 and 5,821,321.

The polysiloxane-polycarbonate block co-condensate according to the invention is preferably produced in a melt transesterification process, more preferably in a reactive extrusion process. The reactive extrusion process preferably comprises mixing and reacting the following components in the melt in an extruder or high viscosity reactor a) at least one polymer-containing structural units of formula (3), preferably an aromatic polycarbonate b) at least one hydroxylaryl-terminated (poly)siloxane, preferably according to any of formulae 9, 10, 11a, 12, 13, 14 c) optionally using at least one additive such as for example a catalyst.

The extruder or melt reactor may be a single-screw reactor, a twin-screw reactor or a multi-screw reactor, for example, a planetary roller extruder or a ring extruder. A high-volume kneader reactor may also be concerned.

The process may be carried out in a single apparatus—for example a twin-screw extruder or else in two stages, i.e. a reactor combination. The reactor combination preferably consists of a pre-reactor—such as a twin-screw extruder—and a high-viscosity reactor.

The process is preferably performed at temperatures of 280° C. to 400° C., preferably of 290° C. to 380° C., more preferably of 300° C. to 350° C., and pressures of 0.001 mbar to 50 mbar, preferably 0.005 mbar to 40 mbar, especially preferably 0.02 to 30 mbar and very particularly preferably 0.03 to 5 mbar, preferably in the presence of a catalyst.

Component C

Component C comprises rubber-modified graft polymers. These graft polymers comprise C.1 5% to 95% by weight, preferably 7% to 50% by weight, particularly preferably 10% to 30% by weight, based on component C, of at least one vinyl monomer on C.2 95% to 5% by weight, preferably 93% to 50% by weight, particularly preferably 90% to 70% by weight, based on component C, of one or more rubber-like graft substrates based on silicone-acrylate composite rubber.

The vinyl monomers are used to form polymer chains and these are chemically bonded to the graft substrate C.2

The graft substrates have glass transition temperatures of <10° C., preferably <0° C., particularly preferably <−20° C.

The glass transition temperature is measured by means of dynamic differential calorimetry (DSC) to the standard DIN EN 61006 at a heating rate of 10 K/min, with definition of the $T_g$ as the midpoint temperature (tangent method).

The graft substrate C.2 generally has a median particle size ($d_{50}$) of 0.05 to 10 μm, preferably 0.1 to 5 μm, particularly preferably 0.2 to 1 μm.

The median particle size $d_{50}$ is the diameter with in each case 50% by weight of the particles above it and 50% by weight of the particles below it. It can be determined by ultracentrifugation (W. Scholtan, H. Lange, Kolloid, Z. and Z. Polymere [polymers] 250 (1972), 782-1796).

Monomers C.1 are preferably mixtures of

C.1.1 50 to 99, preferably 60 to 80, especially 70 to 80 parts by weight, based on C.1, of vinylaromatics and/or ring-substituted vinylaromatics (such as styrene, α-methylstyrene, p-methylstyrene, p-chlorostyrene) and/or ($C_1$-$C_8$)-alkyl methacrylates, such as methyl methacrylate, ethyl methacrylate, and C.1.2 1 to 50, preferably 20 to 40, especially 20 to 30 parts by weight, based on C.1, of vinyl cyanides (unsaturated nitriles such as acrylonitrile and methacrylonitrile) and/or ($C_1$-$C_8$)-alkyl (meth)acrylates, such as methyl methacrylate, n-butyl acrylate, tert-butyl acrylate, and/or derivatives (such as anhydrides and imides) of unsaturated carboxylic acids, for example maleic anhydride and N-phenylmaleimide.

Preferred monomers C.1.1 are selected from at least one of the monomers styrene, α-methylstyrene and methyl methacrylate; preferred monomers C.1.2 are selected from at least one of the monomers acrylonitrile, maleic anhydride and methyl methacrylate. Particularly preferred monomers are C.1.1 styrene and C.1.2 acrylonitrile or C.1.1=C.1.2 methyl methacrylate.

The graft copolymers C are produced by free-radical polymerization, for example by emulsion, suspension, solution or bulk polymerization, preferably by emulsion or bulk polymerization, in particular by emulsion polymerization.

The gel content of the graft substrate C.2 is at least 30% by weight, preferably at least 40% by weight, in particular at least 60% by weight, in each case based on C.2 and measured as insoluble fraction in toluene.

The gel content of the graft substrate C.2 is determined at 25° C. in a suitable solvent as content insoluble in these solvents (M. Hoffmann, H. Kromer, R. Kuhn, Polymeranalytik I and II, Georg Thieme-Verlag, Stuttgart 1977).

Since, as is well known, the graft monomers are not necessarily completely grafted onto the graft substrate in the grafting reaction graft polymers C are according to the invention to be understood as also including products which are obtained through (co)polymerization of the graft monomers in the presence of the graft substrate and co-obtained during workup. These products may accordingly also comprise free (co)polymer of the graft monomers, i.e. (co) polymer not chemically bonded to the rubber.

A silicone-acrylate composite rubber or a mixture of different silicone-acrylate composite rubbers is employed as the graft substrate C.2. These silicone-acrylate composite rubbers are preferably composite rubbers having graft-active sites containing 5-95% by weight, preferably 20% to 80% by weight, particularly preferably 25% to 50% by weight, of silicone rubber proportion C.2.1 and 95% to 5% by weight, preferably 80% to 20% by weight, particularly preferably 75% to 50% by weight, of polyalkyl (meth)acrylate rubber proportion C.2.2, wherein the two recited rubber components penetrate one another in the composite rubber and are therefore essentially inseparable.

The particularly preferred proportions of silicone rubber and polyalkyl (meth)acrylate rubber results in a particularly advantageous combination of good mechanical properties, good surface of the component parts and good resistance toward hydrolytic molecular weight degradation and the influence of chemicals.

Silicone-acrylate composite rubbers are known and are described for example in U.S. Pat. No. 5,807,914, EP 430134 and U.S. Pat. No. 4,888,388.

Suitable silicone rubber components C.2.1 of the silicone-acrylate composite rubbers of C.2 are silicone rubbers having graft-active sites whose production method is described for example in U.S. Pat. Nos. 2,891,920, 3,294,725, DE-A 3 631 540, EP 249964, EP 430134 and U.S. Pat. No. 4,888,388.

The silicone rubber according to C.2.1 is preferably produced by emulsion polymerization in which siloxane monomer units, crosslinking or branching agents (IV) and optionally grafting agents (V) are used.

Examples of preferably employed siloxane monomer units include dimethylsiloxane or cyclic organosiloxanes having at least 3 ring members, preferably 3 to 6 ring members, for example and with preference hexamethylcyclotrisiloxane, octamethylcyclotetrasiloxane, decamethylcyclopentasiloxane, dodecamethylcyclohexasiloxane, trimethyltriphenylcyclotrisiloxanes, tetramethyltetraphenylcyclotetrasiloxanes, octaphenylcyclotetrasiloxane.

The organosiloxane monomers may be used alone or in the form of mixtures comprising 2 or more monomers.

Preferably employed crosslinking or branching agents (IV) are silane-based crosslinking agents having a functionality of 3 or 4, particularly preferably 4. Preferred examples include: trimethoxymethylsilane, triethoxyphenylsilane, tetramethoxysilane, tetraethoxysilane, tetra-n-propoxysilane and tetrabutoxysilane. The crosslinking agent can be used alone or in a mixture of two or more. Particular preference is given to tetraethoxysilane.

Examples of grafting agents (V) include: β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilanes or mixtures thereof.

It is preferable to use 0 to 20% by weight of grafting agent based on the total weight of the silicone rubber.

The silicone rubber may be produced by emulsion polymerization as described for example in U.S. Pat. Nos. 2,891,920 and 3,294,725.

Suitable polyalkyl(meth)acrylate rubber components C.2.2 of the silicone-acrylate-composite rubbers may be produced from alkyl methacrylates and/or alkyl acrylates, a crosslinking agent (VI) and a grafting agent (VII). Examples of preferred alkyl methacrylates and/or alkyl acrylates include the $C_1$- to $C_8$-alkyl esters, for example methyl, ethyl, n-butyl, t-butyl, n-propyl, n-hexyl, n-octyl, n-lauryl and 2-ethylhexyl esters; haloalkyl esters, preferably halo-$C_1$-$C_8$-alkyl esters, such as chloroethyl acrylate, and mixtures of these monomers. Particular preference is given to n-butyl acrylate.

Employable crosslinking agents (VI) for the polyalkyl (meth)acrylate rubber component of the silicone-acrylate rubber include monomers having more than one polymerizable double bond. Preferred examples of crosslinking monomers are esters of unsaturated monocarboxylic acids having 3 to 8 carbon atoms and unsaturated monohydric alcohols having 3 to 12 carbon atoms or saturated polyols having 2 to 4 OH groups and 2 to 20 carbon atoms, such as ethylene glycol dimethacrylate, propylene glycol dimethacrylate, 1,3-butylene glycol dimethacrylate and 1,4-butylene glycol dimethacrylate. The crosslinking agents can be used alone or in mixtures of at least two crosslinking agents.

Examples of preferred grafting agents (VII) include allyl methacrylate, triallyl cyanurate, triallyl isocyanurate or mixtures thereof. Allyl methacrylate may also be used as the crosslinking agent (VI). The grafting agents can be used alone or in mixtures of at least two grafting agents.

The amount of crosslinking agent (VI) and grafting agent (VII) is 0.1 to 20% by weight based on the total weight of the polyalkyl (meth)acrylate rubber component of the silicone-acrylate rubber.

The silicone-acrylate-composite rubber is produced by first producing the silicone rubber of C.2.1 in the form of an aqueous latex. This latex is then enriched with the alkyl methacrylates and/or alkyl acrylates to be used, the crosslinking agent (VI) and the grafting agent (VII) and a polymerization is performed.

The recited silicone-acrylate composite graft rubbers are produced by grafting the monomers C.1 onto the rubber substrate C.2.

This can be carried out using the polymerization methods described in EP 249964, EP 430134 and U.S. Pat. No. 4,888,388 for example.

The silicone-acrylate composite graft rubbers mentioned as component C are commercially available. Examples include: Metablen® SX 005, Metablen® S-2001 and Metablen® S-2030 from Mitsubishi Rayon Co. Ltd.

Component D

A phosphazene or a mixture of different phosphazenes e is employed as component D. Phosphazenes are compounds of formulae (15a) and (15b)

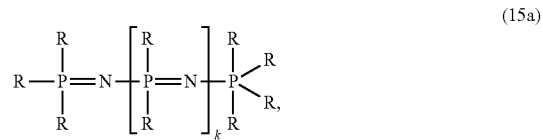

wherein

R is in each case identical or different and represents
  an amine radical,
  in each case optionally halogenated, preferably fluorine-halogenated, more preferably monohalogenated, $C_1$- to $C_8$-alkyl, preferably methyl, ethyl, propyl or butyl,
  $C_1$- to $C_8$-alkoxy, preferably methoxy, ethoxy, propoxy or butoxy,
  in each case optionally alkyl-substituted, preferably $C_1$-$C_4$-alkyl-substituted, and/or halogen-substituted, preferably chlorine- and/or bromine-substituted, $C_5$- to $C_6$-cycloalkyl,
  in each case optionally alkyl-substituted, preferably $C_1$-$C_4$-alkyl-substituted, and/or halogen-substituted, preferably chlorine-, bromine-substituted, and/or hydroxyl-substituted, $C_6$- to $C_{20}$-aryloxy, preferably phenoxy, naphthyloxy, in each case optionally alkyl-substituted, preferably $C_1$-$C_4$-alkyl-substituted, and/or halogen-substituted, preferably chlorine- and/or bromine-substituted, $C_7$- to $C_{12}$-aralkyl, preferably phenyl-$C_1$-$C_4$-alkyl, or a halogen radical, preferably chlorine or fluorine, or an OH radical.

k is 0 or a number from 1 to 15, preferably a number from 1 to 10.

In the case where the phosphazene of formula (15a) or (15b) is halogen-substituted at the phosphorus, for example from incompletely reacted starting material, the proportion of this phosphazene halogen-substituted at the phosphorus is preferably less than 1000 ppm, more preferably less than 500 ppm.

In a further preferred embodiment only phosphazenes having identical R are employed.

Cyclic phosphazenes of formula (15b) are preferred and propoxyphosphazene, phenoxyphosphazene, methylphenoxyphosphazene, aminophosphazene and fluoralkylphosphazenes and also phosphazenes having the following structures are more preferred:

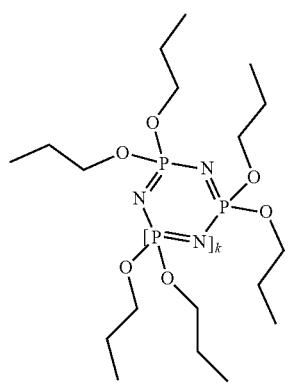

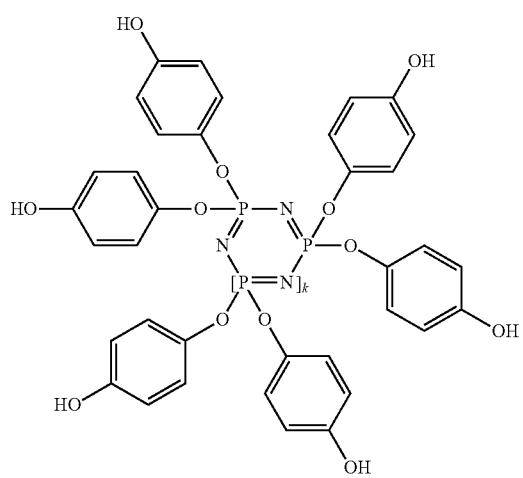

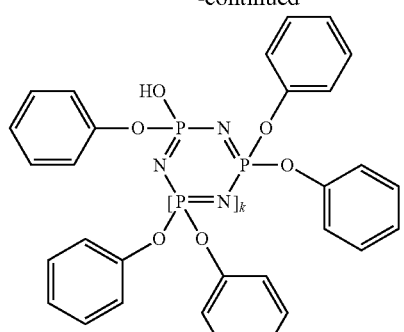

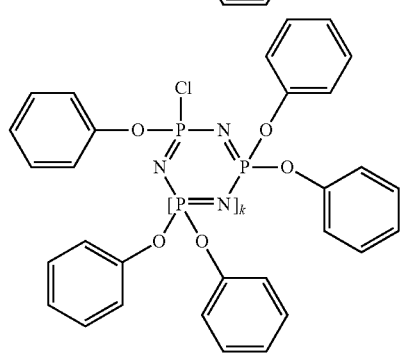

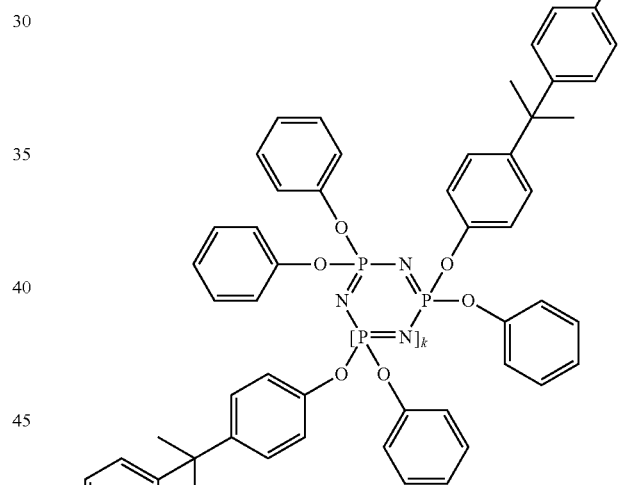

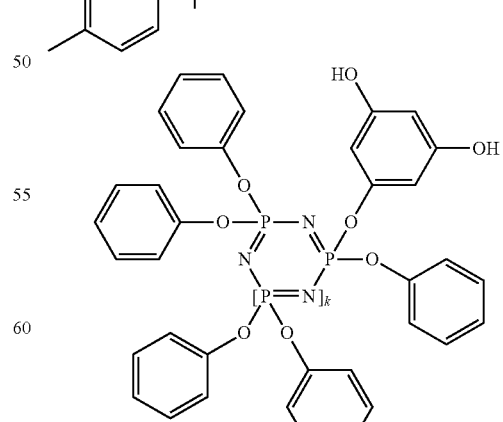

In the compounds shown above k=1, 2 or 3.

Cyclic phenoxyphosphazene (all R=phenoxy) having a proportion of oligomers where k=1 (C1) of 60 to 98 mol %, more preferably 65 to 85 mol %, according to formula (16) is very particularly preferred.

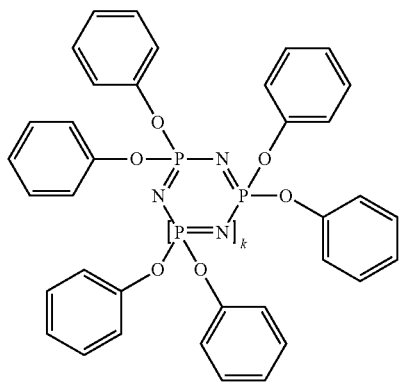

(16)

Component C is preferably a phenoxyphosphazene having a trimer proportion (k=1) of 65 to 85 mol %, a tetramer proportion (k=2) of 10 to 20 mol %, a proportion of higher oligomeric phosphazenes (k=3, 4, 5, 6 and 7) of 5 to 20 mol % and phosphazene oligomers with k>=8 of 0 to 2 mol % based on component C.

Phosphazenes and the production thereof are described in EP-A 728 811, DE-A 1 961668 and WO 97/40092 for example.

The oligomer compositions of the phosphazenes in the respective blend samples may be detected and quantified by $^{31}P$ NMR even after compounding (chemical shift; δ trimer: 6.5 to 10.0 ppm; δ tetramer: −10 to −13.5 ppm; δ higher oligomers: −16.5 to −25.0 ppm).

Component E

The composition may comprise as component E one or more further additives preferably selected from the group consisting of antidrip agents, flame retardant synergists, lubricants and demoulding agents (for example pentaerythritol tetrastearate), nucleating agents, antistats, conductivity additives, stabilizers (e.g. hydrolysis, heat ageing and UV stabilizers, and also transesterification inhibitors and acid/base quenchers), flow promoters, compatibilizers, further impact modifiers distinct from component C (either with or without core-shell structure), further polymeric constituents (for example functional blend partners), fillers and reinforcers (for example talc, glass fibres, carbon fibres) and dyes and pigments (for example titanium dioxide or iron oxide).

Employable antidrip agents include for example polytetrafluoroethylene (PTFE) or PTFE-containing compositions, for example masterbatches of PTFE with styrene- or methyl methacrylate-containing polymers or copolymers, in the form of a powder or a coagulated mixture, for example with component B.

In a preferred embodiment the composition contains at least one polymer additive selected from the group consisting of lubricants and demoulding agents, stabilizers, flow promoters, antidrip agents, smoke inhibitors and dyes and pigments.

In a preferred embodiment the composition contains pentaerythritol tetrastearate as a demoulding agent.

In a preferred embodiment the composition contains as a stabilizer at least one representative selected from the group consisting of sterically hindered phenols, organic phosphites, sulfur-based co-stabilizers and organic and inorganic Bronsted acids.

In an especially preferred embodiment the composition contains as a stabilizer a combination of octadecyl 3-(3,5-di-tert-butyl-4-hydroxyphenyl)propionate and tris(2,4-di-tert-butylphenyl) phosphite.

It is preferable when the component E) contains 0.05% to 2.0% by weight of antidrip agents, 0.05% to 2.0% by weight of demoulding agents and 0.05% to 2.0% by weight of stabilizers in each case based on the sum of the components A)-E).

Production of the Moulding Compounds and Moulded Articles

The compositions according to the invention can be used to produce thermoplastic moulding compounds.

The thermoplastic moulding compounds according to the invention may be produced for example by mixing the respective constituents of the compositions and melt-compounding and melt-extruding the constituents at temperatures of preferably 200° C. to 320° C., particularly preferably at 240° C. to 300° C., in customary apparatuses such as for example internal kneaders, extruders and twin-shaft screw systems in a known manner.

In the context of the present application this process is generally referred to as compounding. The term "moulding compound" is thus to be understood as meaning the product obtained when the constituents of the composition are melt-compounded and melt-extruded.

The mixing of the individual constituents of the compositions may be carried out in a known manner, either successively or simultaneously, either at about 20° C. (room temperature) or at a higher temperature. This means that for example some of the constituents may be added via the main intake of an extruder and the remaining constituents may be supplied subsequently in the compounding process via an ancillary extruder.

The invention also provides a process for producing the inventive moulding compounds and the use of the moulding compounds for producing moulded articles.

The moulding compounds according to the invention may be used to produce moulded articles of any kind. These may be produced by injection moulding, extrusion and blow-moulding processes for example. A further form of processing is the production of moulded articles by deep drawing from previously produced sheets or films. The moulding compounds according to the invention are particularly suitable for processing by extrusion, blow-moulding and deep drawing methods.

The constituents of the compositions may also be metered directly into an injection moulding machine or into an extrusion apparatus and processed into moulded articles.

Examples of such moulded articles that are producible from the compositions and moulding compounds according to the invention are films, profiles, housing parts of any kind, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications) and also electrical and electronic components such as switches, plugs and sockets, and parts for commercial vehicles, in particular for the automotive sector. The compositions and moulding compounds according to the invention are also suitable for producing the following moulded articles or mouldings: ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, moulded parts for sanitation and bathroom equipment, protective grilles for ventilation openings and housings for garden equipment.

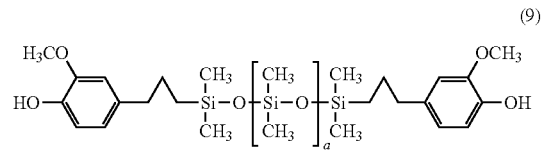

(9)

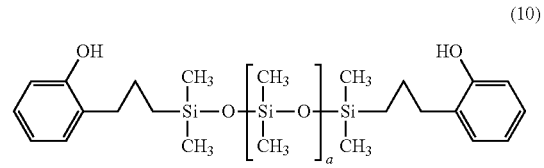

(10)

wherein a in formulae (9) and (10) represents an average number from 10 to 400, preferably 10 to 100 and particularly preferably 15 to 50 in each case determined by 1H-NMR spectroscopy,

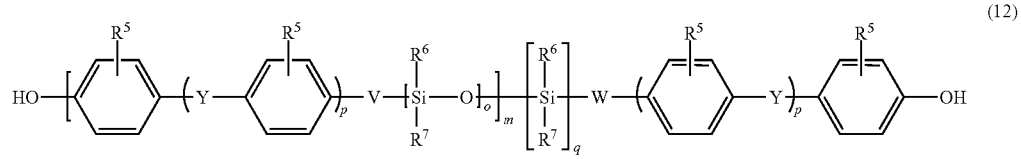

(12)

wherein $R^5$ represents hydrogen or C1 to C4 alkyl, preferably hydrogen or methyl, $R^6$ and $R^7$ independently of one another represent C1 to C4 alkyl, preferably methyl, Y represents a single bond, —CO—, —O—, $C_1$- to $C_5$-alkylene, $C_2$- to $C_5$-alkylidene or a $C_5$- to $C_6$-cycloalkylidene radical which may be mono- or polysubstituted by $C_1$- to $C_4$-alkyl, preferably a single bond, —O—, isopropylidene or a $C_5$- to $C_6$-cycloalkylidene radical which may be mono- or polysubstituted by $C_1$- to $C_4$-alkyl, V represents oxygen, C1-C6 alkylene or C2- to C5-alkylidene, preferably a single bond, oxygen or C3 alkylene, especially oxygen or isopropylidene.

W represents a single bond, S, C1 to C6-alkylene or C2- to C5-alkylidene, preferably a single bond, C3 alkylene or isopropylidene, wherein W is not a single bond when q represents 1, p and q each independently of one another represent 0 or 1, o represents an average number of repeating units from 10 to 400, preferably 10 to 100, in each case determined by 1H-NMR spectroscopy and m represents an average number of repeating units from 1 to 6, preferably 2 to 5, in each case determined by 1H-NMR spectroscopy.

Further embodiments 1 to 23 of the present invention are described hereinbelow:

1. Composition for producing a thermoplastic moulding compound, wherein the composition contains or consists of the following constituents:
   A) 42% to 80% by weight of at least one polymer selected from the group consisting of aromatic polycarbonate and aromatic polyestercarbonate,
   B) 2% to 38% by weight of at least one polysiloxane-polycarbonate block co-condensate,
   C) 1% to 15% by weight of at least one rubber-modified graft polymer comprising
      C.1) 5% to 95% by weight based on the graft polymer C of a shell composed of at least one vinyl monomer and
      C.2) 95% to 5% by weight based on the graft polymer C of a graft substrate composed of silicone-acrylate composite rubber,
   D) 2% to 10% by weight of at least one phosphazene,
   E) 0% to 10% by weight of at least one additive.
2. Composition according to embodiment 1, characterized in that the graft substrate C.2 contains 20% to 80% by weight of silicone rubber and 80% to 20% by weight of polyalkyl (meth)acrylate rubber.
3. Composition according to embodiment 2, characterized in that the graft substrate C.2 contains 25% to 50% by weight of silicone rubber and 75% to 50% by weight of polyalkyl (meth)acrylate rubber.
4. Composition according to any of the preceding embodiments, characterized in that the component B contains siloxane blocks derived from at least one of the following structures 9, 10 and 12:

5. Composition according to embodiment 1 or 2, characterized in that the component B contains siloxane blocks derived from the following structure:

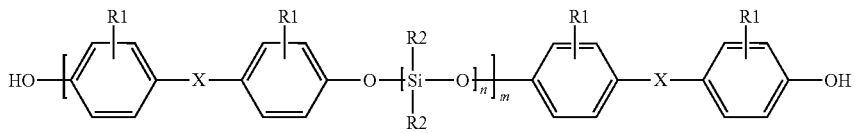

(14)

wherein R1 represents hydrogen, Cl, Br, C1-C4-alkyl, preferably hydrogen or methyl, R2 independently represents aryl or alkyl, preferably methyl, X represents a single bond, C1 to C5-alkylene, C2 to C5-alkylidene, C5 to C12-cycloalkylidene, —O—, —SO—, —CO—, —S—, —SO2—, preferably a single bond, isopropylidene, C5 to C12 cycloalkylidene or oxygen and very particularly preferably isopropylidene, n is a number between 10 and 150 determined by 1H-NMR spectroscopy, m is a number from 1 to 10 determined by 1H-NMR spectroscopy.

6. Composition according to embodiment 5, wherein X represents isopropylidene.

7. Composition according to any of the preceding embodiments, characterized in that the component B contains a proportion of 2% to 20% by weight of siloxane blocks.

8. Composition according to any of the preceding embodiments, characterized in that the component B contains a proportion of 3% to 10% by weight of siloxane blocks.

9. Composition according to any of the preceding embodiments, characterized in that the molecular weight of the siloxane component in component B is 3000 to 20 000 g/mol determined by gel permeation chromatography and using a BPA (bisphenol A) polycarbonate standard.

10. Composition according to any of the preceding embodiments, characterized in that the molecular weight of the siloxane component in component B is 3500 to 15 000 g/mol determined by gel permeation chromatography and using a BPA (bisphenol A) polycarbonate standard.

11. Composition according to any of the preceding embodiments, characterized in that methyl methacrylate is employed as component C.1.

12. Composition according to any of the preceding embodiments, characterized in that component A has a weight-average molecular weight $M_w$ of 23 000 to 33 000 g/mol determined by gel permeation chromatography in methylene chloride using a bisphenol A-based polycarbonate as a standard.

13. Composition according to any of the preceding embodiments, characterized in that bisphenol A-based aromatic polycarbonate is used as component A.

14. Composition according to any of the preceding embodiments, characterized in that component D is a cyclic phosphazene of formula (15b)

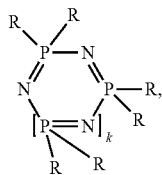

(15b)

wherein k represents 1 or an integer from 1 to 10 wherein the trimer content (k=1) is from 60 to 98 mol % based on component C and wherein R is in each case identical or different and represents an amine radical, in each case optionally halogenated, preferably fluorine-halogenated, $C_1$- to $C_8$-alkyl, preferably methyl, ethyl, propyl or butyl, $C_1$- to $C_8$-alkoxy, preferably methoxy, ethoxy, propoxy or butoxy, in each case optionally alkyl-substituted, preferably $C_1$-$C_4$-alkyl-substituted, and/or halogen-substituted, preferably chlorine- and/or bromine-substituted, $C_5$- to $C_6$-cycloalkyl, in each case optionally alkyl-substituted, preferably $C_1$-$C_4$-alkyl-substituted, and/or halogen-substituted, preferably chlorine-, bromine-substituted, and/or hydroxyl-substituted, $C_6$- to $C_{20}$-aryloxy, preferably phenoxy, naphthyloxy, in each case optionally alkyl-substituted, preferably $C_1$-$C_4$-alkyl-substituted, and/or halogen-substituted, preferably chlorine- and/or bromine-substituted, $C_7$- to $C_{12}$-aralkyl, preferably phenyl-$C_1$-$C_4$-alkyl, or a halogen radical, preferably chlorine, or an OH radical.

15. Composition according to embodiment 15, characterized in that component D is a cyclic phosphazene where R=phenoxy.

16. Compositions according to either of embodiments 14 and 15, characterized in that it has a trimer proportion (k=1) of 65 to 85 mol %, a tetramer proportion (k=2) of 10 to 20 mol %, a proportion of higher oligomeric phosphazenes (k=3, 4, 5, 6 and 7) of 5 to 15 mol % and a proportion of phosphazene oligomers where k>=8 of 0 to 1 mol % in each case based on component D.

17. Composition according to any of the preceding embodiments, characterized in that the component E contains talc.

18. Composition according to any of the preceding embodiments containing
45% to 75% by weight of the component A,
5% to 35% by weight of the component B,
4% to 12% by weight of the component C,
3% to 9% by weight of the component D,
0.1% to 8% by weight of the component E.

19. Composition according to any of the preceding embodiments containing
50% to 70% by weight of the component A,
15% to 35% by weight of the component B,
5% to 11% by weight of the component C,
4% to 8% by weight of the component D,
0.2% to 5% by weight of the component E.

20. Composition according to any of the preceding embodiments consisting of the components A, B, C, D and E.

21. Use of a composition according to any of preceding embodiments 1 to 20 for producing moulded articles.

22. Moulding compound produced from a composition according to any of preceding embodiments 1 to 20.

23. Moulded article obtainable from a composition according to any of preceding embodiments 1 to 20 or from a moulding compound according to embodiment 22.

EXAMPLES

Component A:

Bisphenol A-based linear polycarbonate having a weight-averaged molecular weight $M_w$ of 26 500 g/mol (determined by GPC in methylene chloride using a bisphenol A-based polycarbonate as a standard).

Component B:

Polysiloxane-polycarbonate block co-condensate composed of bisphenol A and siloxane blocks of structure (13)

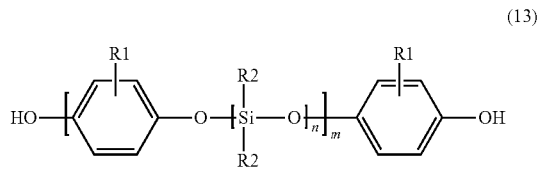

(13)

having an MVR of about 4 (measured at 300° C., 1.2 kg; ISO 1133) and a siloxane block content of about 5% by weight (where n=30 and m=3-4; R1=H; R2=methyl).

Component C-1

Graft polymer composed of 14% by weight of methyl methacrylate on 86% by weight of a silicone-acrylate composite rubber as the graft substrate, wherein the silicone-acrylate composite rubber contains 36% by weight of silicone rubber and 64% by weight of polyalkyl (meth)acrylate rubber and wherein the two recited rubber components penetrate one another in the composite rubber and are therefore essentially inseparable.

Component C-2

Graft polymer composed of 17% by weight of methyl methacrylate on 83% by weight of a silicone-acrylate composite rubber as the graft substrate, wherein the silicone-acrylate composite rubber contains 11% by weight of silicone rubber and 89% by weight of polyalkyl (meth)acrylate rubber and wherein the two recited rubber components penetrate one another in the composite rubber and are therefore essentially inseparable.

Component C-3

Graft polymer produced by reaction of 11% by weight of methyl methacrylate on 89% by weight of a silicone-acrylate composite rubber as the graft substrate, wherein the silicone-acrylate composite rubber contains 92% by weight of silicone rubber and 8% by weight of polyalkyl (meth)acrylate rubber and wherein the two recited rubber components penetrate one another in the composite rubber and are therefore essentially inseparable.

Component C-4

Graft polymer of MBS type in which 15% by weight of a shell of methyl methacrylate are grafted onto 85% by weight of a polybutadiene-styrene rubber substrate, EXL 2650A, Dow Chemical.

Component D:

Phenoxyphosphazene of formula (16) having a proportion of oligomers where k=1 of 70 mol %, a proportion of oligomers where k=2 of 18 mol % and a proportion of oligomers where k>3 of 12 mol %.

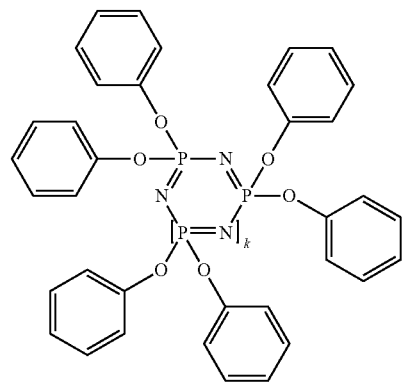

(16)

Component E-1:

Compacted talc having a talc content of 99%, an iron oxide content of 0.4%, an aluminium oxide content of 0.4%, ignition loss of 6.0%, pH (to EN ISO 787-9:1995) of 9.55, D50 (sedimentation analysis) of 0.65 μm; BET surface area 13.5 m2/g, type: HTPultra5c, manufacturer: Imifabi Component E-2:

Cycolac INP449: polytetrafluoroethylene (PTFE) preparation from Sabic composed of 50% by weight of PTFE contained in an SAN copolymer matrix.

Component E-3:

Irganox B 900 (mixture of 80% Irgafox™ 168 (tris(2,4-di-tert-butylphenyl) phosphite) and 20% Irganox™ 1076 (2,6-di-tert-butyl-4-(octadecanoxycarbonylethyl)phenol); BASF (Ludwigshafen, Germany)

Component E-4:

Pentaerythritol tetrastearate (demoulding agent)

Component E-5:

Black Pearls™ 800 (Cabot Corp., Belgium): carbon black pigment

Production and Testing of the Moulding Compounds According to the Invention

The components were mixed in a ZSK-25 twin-screw extruder from Werner & Pfleiderer at a melt temperature of 260° C. The moulded articles were produced at a melt temperature of 260° C. and a mould temperature of 80° C. in an Arburg 270 E injection moulding machine.

Employed as a measure for hydrolysis resistance is the percentage change in MVR at 260° C. (according to ISO 1133, 2012 version, with an applied load of 5 kg) during storage of the granulate at 95° C. and 100% relative humidity for 7 days.

Elastic modulus is determined at room temperature according to ISO 527 (1996 version).

The IZOD notched impact strength was determined at −20° C. on test bars having dimensions of 80 mm×10 mm×4 mm according to ISO 180/U (2013 version).

Maximum force in the puncture test according to ISO 6603-2 (2002 version) is used as a measure for material ductility under multiaxial stress. This is performed at 23° C. on test specimens having dimensions of 60 mm×60 mm×2 mm.

Flame retardancy is assessed on strips measuring 127× 12.7×1.5 mm in accordance with UL94V.

Stress cracking (ESC) resistance in rapeseed oil at room temperature was used as a measure for chemicals resistance. A test specimen measuring 80 mm×10 mm×4 mm injection-moulded at melt temperature 260° C. is subjected to 2.4% external outer fibre strain by means of a clamping template and completely immersed in the liquid, and the time required for fracture failure induced by environmental stress cracking is determined. The test method is based on ISO 22088 (2006 version).

To assess surface quality a specimen sheet having dimensions of 60×40×2 mm is produced at an injection-moulding temperature of 290° C. and subsequently visually inspected. A glossy homogenous surface of the injection-moulded article is designated "$" and in case of small marks is designated "*". If the sheets are matt this is noted accordingly.

All moulding compounds from the tables 1 to 3 achieve a UL 94 V rating of at least V1 at 1.5 mm.

TABLE 1

Moulding compounds and properties thereof

| | (Comp.) 1 | 2 | 3 | 4 | (Comp.) 5 |
|---|---|---|---|---|---|
| Components [parts by weight] | | | | | |
| A | 83.2 | 73.2 | 63.2 | 53.2 | 43.2 |
| B | | 10.0 | 20.0 | 30.0 | 40.0 |
| C-1 | 9.0 | 9.0 | 9.0 | 9.0 | 9.0 |
| D | 6.5 | 6.5 | 6.5 | 6.5 | 6.5 |
| E-2 | 0.8 | 0.8 | 0.8 | 0.8 | 0.8 |
| E-3 | 0.1 | 0.1 | 0.1 | 0.1 | 0.1 |
| E-4 | 0.4 | 0.4 | 0.4 | 0.4 | 0.4 |
| E-5 | 0.5 | 0.5 | 0.5 | 0.5 | 0.5 |
| Properties | | | | | |
| IZOD notched impact strength at −20° C. [kJ/m$^2$] | 47.9 | 46.3 | 50.2 | 52.4 | 52.4 |
| Delta hydrolysis | 64% | 63% | 61% | 52% | 78% |
| Stress cracking (ESC) resistance [h:min until fracture] | 12:25 | 14:20 | 15:35 | 24:05 | 38:35 |
| Elastic modulus [N/mm$^2$] | 2028 | 1995 | 1998 | 1980 | 1970 |
| Max. puncture force [N] | 4548 | 4519 | 4505 | 4440 | 4391 |
| Surface assessment MPL/ appearance $ . . . glossy; * . . . small mark; matt | $ | $ | $ | $ | $ |

TABLE 2

Moulding compounds and properties thereof

| | (Comp.) 6 | 7 | 8 | 9 | (Comp.) 10 |
|---|---|---|---|---|---|
| Components [parts by weight] | | | | | |
| A | 80.2 | 70.2 | 60.2 | 50.2 | 40.2 |
| B | | 10.0 | 20.0 | 30.0 | 40.0 |
| C-1 | 9.0 | 9.0 | 9.0 | 9.0 | 9.0 |
| D | 6.5 | 6.5 | 6.5 | 6.5 | 6.5 |
| E-1 | 3.0 | 3.0 | 3.0 | 3.0 | 3.0 |
| E-2 | 0.8 | 0.8 | 0.8 | 0.8 | 0.8 |
| E-3 | 0.1 | 0.1 | 0.1 | 0.1 | 0.1 |
| E-4 | 0.4 | 0.4 | 0.4 | 0.4 | 0.4 |
| E-5 | 0.5 | 0.5 | 0.5 | 0.5 | 0.5 |
| Properties | | | | | |
| IZOD notched impact strength at −20° C. [kJ/m$^2$] | 22.8 (brittle) | 41.6 (tough) | 50.6 (tough) | 52.7 (tough) | 56.0 (tough) |
| Delta hydrolysis | 42% | 42% | 43% | 38% | 45% |
| Stress cracking (ESC) resistance [h:min until fracture] | 17:30 | 21:01 | 40:16 | 57:55 | 71:55 |
| Elastic modulus [N/mm$^2$] | 2314 | 2267 | 2247 | 2212 | 2180 |
| Max. puncture force [N] | 4364 | 4371 | 4292 | 4356 | 3881 |
| Surface assessment MPL/ appearance $ . . . glossy; * . . . small mark; matt | $ | $ | $/* | $/* | $/* |

TABLE 3

Moulding compounds and properties thereof

| | 3 | 11 | 4 | 12 |
|---|---|---|---|---|
| Components [parts by weight] | | | | |
| A | 63.2 | 63.2 | 53.2 | 53.2 |
| B | 20.0 | 20.0 | 30.0 | 30.0 |
| C-1 | 9.0 | | 9.0 | |
| C-2 | | 9.0 | | |
| C-3 | | | | 9.0 |
| D | 6.5 | 6.5 | 6.5 | 6.5 |
| E-2 | 0.8 | 0.8 | 0.8 | 0.8 |
| E-3 | 0.1 | 0.1 | 0.1 | 0.1 |
| E-4 | 0.4 | 0.4 | 0.4 | 0.4 |
| E-5 | 0.5 | 0.5 | 0.5 | 0.5 |
| Properties | | | | |
| IZOD notched impact strength at −20° C. [kJ/m$^2$] | 50.2 | 48.6 | 52.4 | 46.6 |
| Delta hydrolysis | 61% | >200% | 52% | 195% |
| Stress cracking (ESC) resistance [h:min until fracture] | 15:35 | 13:15 | 24:05 | 16:00 |
| Elastic modulus [N/mm$^2$] | 1998 | 1977 | 1980 | 1964 |
| Max. puncture force [N] | 4505 | 4501 | 4440 | 4213 |
| Surface assessment MPL/ appearance $ . . . glossy; * . . . small mark | $ | somewhat matt | $ | matt | n.m.: not measurable, too high

TABLE 4

Moulding materials and properties thereof

| | 13 | 14 | 15 | 16 |
|---|---|---|---|---|
| Components [parts by weight] | | | | |
| A | 67.2 | 67.2 | 51.2 | 51.2 |
| B | 20.0 | 20.0 | 30.0 | 30.0 |
| C-1 | 5.0 | | 11.0 | |
| C-4 | | 5.0 | | 11.0 |
| D | 6.0 | 6.0 | 6.0 | 6.0 |
| E-2 | 0.8 | 0.8 | 0.8 | 0.8 |
| E-3 | 0.1 | 0.1 | 0.1 | 0.1 |
| E-4 | 0.9 | 0.9 | 0.9 | 0.9 |
| Properties | | | | |
| IZOD notched impact strength at −20° C. [kJ/m$^2$] | 52 | 54 | 50 | 48 |
| Delta hydrolysis | 46 | 48 | 44 | 59 |
| Stress cracking (ESC) resistance [h:min until fracture] | 16:20 | 14:00 | 20:35 | 14:30 |
| Elastic modulus [N/mm$^2$] | 2176 | 2192 | 1904 | 1983 |
| Max. puncture force [N] | 4725 | 4714 | 4273 | 4322 |
| Surface assessment MPL/ appearance $ . . . glossy; * . . . small mark | $ | $ | $/* | $ |

The examples from tables 1-4 show that the compositions and the moulded articles according to the invention exhibit a good balance of good low temperature notched impact strength, high maximum force in the puncture test (i.e. good multiaxial toughness), high stiffness, good stability toward hydrolytically induced molecular weight degradation (low MVR increase) and high chemicals resistance.

Notched impact strength and chemicals resistance are poorer without the component B (comp. 1).

If the proportion of the component B is excessively high surface quality may deteriorate somewhat (table 2), hydrolysis resistance is reduced, as are toughness in the puncture test and stiffness.

The compositions of the examples comprising 20% and 30% by weight of the component B, in which the advantages of the use of component B in terms of toughness and chemicals resistance are most marked without stiffness and toughness in the puncture test having already deteriorated significantly, are particularly advantageous.

The use of component C-1 is likewise preferred. This graft polymer results in a particularly good chemicals resistance, notched impact strength at low temperatures and a high stability toward thermally induced molecular weight degradation and a good moulded article surface (table 3).

The data in table 4 finally show that the graft polymer according to the invention makes it possible to achieve an altogether advantageous profile of properties compared to an MBS graft polymer. Especially hydrolysis stability and chemicals resistance are improved over MBS through the use of the graft polymer according to the invention while the other properties investigated are at a similar level.

The invention claimed is:

1. Composition for producing a thermoplastic moulding compound, wherein the composition contains:
    A) 42% to 80% by weight of at least one polymer selected from the group consisting of aromatic polycarbonate and aromatic polyestercarbonate,
    B) 2% to 38% by weight of at least one polysiloxane-polycarbonate block co-condensate characterized in that component B contains siloxane blocks derived from one of the following structures:

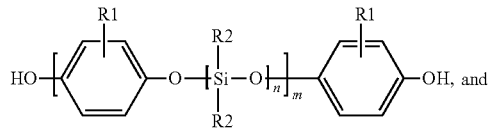
(13)

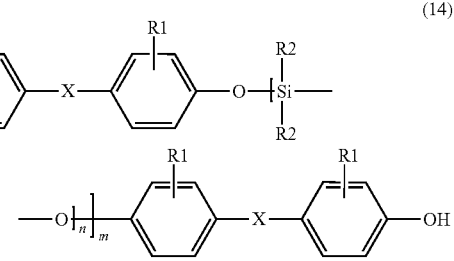
(14)

wherein R1 represents hydrogen, Cl, Br, C1-C4-alkyl,
    R2 independently represents aryl or alkyl,
    X represents a single bond, C1 to C5-alkylene, C2 to C5-alkylidene, C5 to C12-cycloalkylidene, —O—, —SO— —CO—, —S—, or —SO2—,
    n is a number between 10 and 150 determined by 1H-NMR spectroscopy,
    m is a number from 1.5 to 5 determined by 1H-NMR spectroscopy,
    C) 1% to 15% by weight of at least one rubber-modified graft polymer comprising
        C.1) 5% to 95% by weight based on the graft polymer C of a shell composed of at least one vinyl monomer and
        C.2) 95% to 5% by weight based on the graft polymer C of a graft substrate composed of silicone-acrylate composite rubber,
    D) 2% to 10% by weight of at least one phosphazene,
    E) 0% to 10% by weight of at least one additive.

2. Composition according to claim 1, characterized in that the graft substrate C.2 contains 20% to 80% by weight of silicone rubber and 80% to 20% by weight of polyalkyl (meth)acrylate rubber.

3. Composition according to claim 1, characterized in that the component B contains a proportion of 2% to 20% by weight of siloxane blocks.

4. Composition according to claim 1, characterized in that component C.1 is methyl methacrylate.

5. Composition according to claim 1, characterized in that component E contains talc.

6. Composition according to claim 1 containing:
    50% to 70% by weight of component A,
    15% to 35% by weight of component B,
    5% to 11% by weight of component C,
    4% to 8% by weight of component D,
    0.2% to 5% by weight of component E.

7. Composition according to claim 1 consisting of components A, B, C, D and E.

8. Moulded article obtained from the composition according to claim 1.

* * * * *